(12) United States Patent
Yacoub et al.

(10) Patent No.: US 8,579,762 B2
(45) Date of Patent: Nov. 12, 2013

(54) NEGATIVE TORQUE UPSHIFT OFFGOING CLUTCH CONTROL SYSTEMS AND METHODS

(75) Inventors: Mark A Yacoub, Hagerstown, MD (US);
Matthew D. Whitton, Howell, MI (US);
Craig J. Hawkins, Howell, MI (US);
Mark A. Schang, Milford, MI (US);
Robert L. Williams, Holly, MI (US);
Christopher Jay Weingartz, Holly, MI (US)

(73) Assignee: GM Global Technology Operations LLC

( * ) Notice: Subject to any disclaimer, the term of this patent is extended or adjusted under 35 U.S.C. 154(b) by 581 days.

(21) Appl. No.: 12/833,267

(22) Filed: Jul. 9, 2010

(65) Prior Publication Data
US 2012/0010046 A1 Jan. 12, 2012

(51) Int. Cl.
*B60W 10/02* (2006.01)
(52) U.S. Cl.
USPC ............................................. 477/115

(58) Field of Classification Search
USPC .......... 477/127–131, 143, 144, 115; 475/121, 475/122
See application file for complete search history.

(56) References Cited

U.S. PATENT DOCUMENTS

| | | | | | |
|---|---|---|---|---|---|
| 5,795,265 | A | * | 8/1998 | Domian et al. | 477/143 |
| 6,068,576 | A | * | 5/2000 | Tsutsui et al. | 477/144 |
| 6,319,172 | B1 | * | 11/2001 | Steinmetz et al. | 477/143 |
| 6,514,165 | B2 | * | 2/2003 | Saito | 475/121 |
| 7,643,925 | B2 | * | 1/2010 | Whitton | 701/67 |
| 8,290,670 | B2 | * | 10/2012 | Tanaka et al. | 475/121 |
| 2002/0025885 | A1 | * | 2/2002 | Saito et al. | 477/143 |
| 2002/0042326 | A1 | * | 4/2002 | Rosi et al. | 477/143 |

* cited by examiner

*Primary Examiner* — Justin Holmes
*Assistant Examiner* — Jacob S Scott

(57) ABSTRACT

A clutch control system for a vehicle includes a shift command module and an offgoing clutch control module. The shift command module commands an upshift of a clutch-to-clutch transmission when an engine torque is less than a predetermined negative torque. The offgoing clutch control module increases an offgoing clutch pressure above a predetermined apply pressure in response to the command. An offgoing clutch is fully engaged when the offgoing clutch pressure is greater than the predetermined apply pressure.

20 Claims, 6 Drawing Sheets

|   | 30 | 32 | 34 | 36 | 38 |
|---|----|----|----|----|----|
| 1 | X  |    |    |    | X  |
| 2 | X  |    |    | X  |    |
| 3 | X  |    | X  |    |    |
| 4 | X  | X  |    |    |    |
| 5 |    | X  | X  |    |    |
| 6 |    | X  |    | X  |    |
| R |    |    | X  |    | X  |
| N |    |    |    |    | X  |

FIG. 2

NEGATIVE TORQUE UPSHIFT OFFGOING
CLUTCH CONTROL SYSTEMS AND
METHODS

FIELD

The present disclosure relates to clutch-to-clutch transmissions and more particularly to clutch control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine generates torque, which is output to a transmission. An automatic transmission of a vehicle may include a plurality of fluid controlled friction devices, such as clutches. A control module may engage and disengage one or more of the clutches according to a predefined pattern to establish different gear ratios (also called speed ratios) within the transmission.

A gear ratio may be defined in terms of a ratio of a transmission input shaft speed divided by a transmission output shaft speed. A gear shift from one gear ratio to another gear ratio involves disengaging a first clutch that is associated with the current or actual gear ratio, and engaging a second clutch associated with a next gear ratio. The clutch to be disengaged during the gear shift is referred to as the offgoing clutch, and the clutch to be engaged during the gear shift is referred to as the oncoming clutch. Gear shifts of this type may be referred to as clutch-to-clutch shifts because no speed responsive or freewheeling elements are used.

SUMMARY

A clutch control system for a vehicle includes a shift command module and an offgoing clutch control module. The shift command module commands an upshift of a clutch-to-clutch transmission when an engine torque is less than a predetermined negative torque. The offgoing clutch control module increases an offgoing clutch pressure above a predetermined apply pressure in response to the command. An offgoing clutch is fully engaged when the offgoing clutch pressure is greater than the predetermined apply pressure.

A clutch control method for a vehicle includes commanding an upshift of a clutch-to-clutch transmission when an engine torque is less than a predetermined negative torque and increasing an offgoing clutch pressure above a predetermined apply pressure in response to the command. An offgoing clutch is fully engaged when the offgoing clutch pressure is greater than the predetermined apply pressure.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a table of exemplary clutch engagement combinations that may establish various gear ratios according to the principles of the present disclosure;

DETAILED DESCRIPTION

Figure 1:
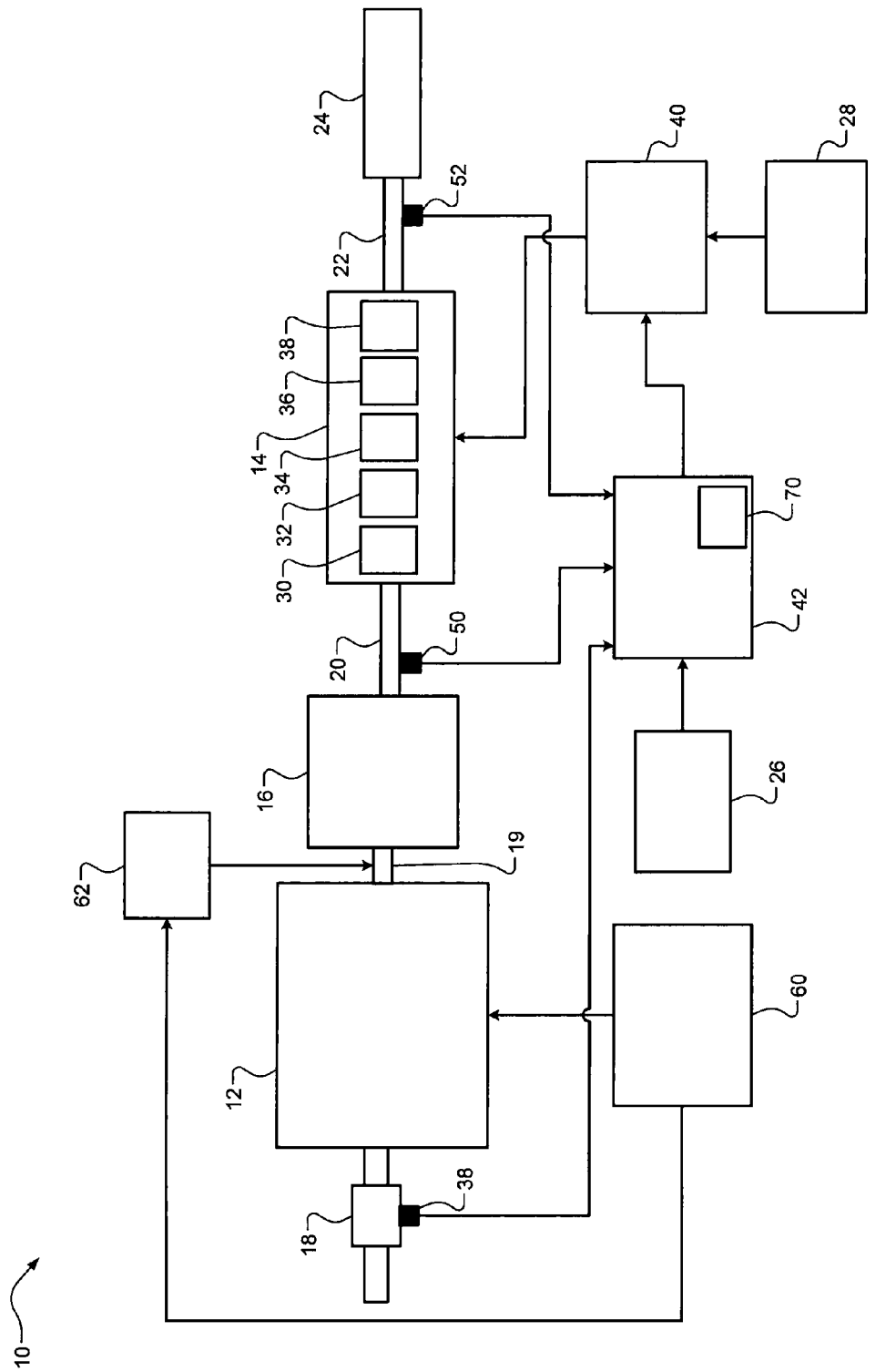
FIG. 1 is a functional block diagram of an exemplary vehicle system including a clutch-to-clutch transmission according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Performing a gear shift of a clutch-to-clutch type transmission involves disengaging an offgoing clutch and applying an oncoming clutch. The gear shift may be, for example, an upshift, a downshift, or another suitable type of gear shift. Performing an upshift involves controlling a transmission input speed down to a synchronization speed.

When torque about a crankshaft of an engine (i.e., engine torque) is positive and an upshift is commanded, a control module disengages the offgoing clutch and fills the oncoming clutch. The positive engine torque would naturally increase the transmission input speed. However, the filling of the oncoming clutch causes partial engagement of the oncoming clutch, and the partial engagement of the oncoming clutch draws the transmission input speed down toward the synchronization speed. The control module completely engages the oncoming clutch when the transmission input speed is within a predetermined range of the synchronization speed.

When the engine torque is negative (e.g., less than a predetermined negative torque), however, the transmission input speed naturally decreases toward the synchronization speed. The engine torque may be negative under various circumstances, such as when regenerative braking is being performed.

A negative torque upshift (NTU) module of the present disclosure controls the disengagement of the offgoing clutch when an upshift is commanded and the engine torque is negative. Controlling the disengagement of the offgoing clutch as opposed to controlling the engagement of the oncoming clutch when an upshift is commanded and the engine torque is negative may provide more desirable characteristics as the transmission input speed approaches and reaches the synchronization speed.

Referring now to FIG. 1, a functional block diagram of an exemplary vehicle system 10 is presented. An engine 12 drives a transmission 14 via a torque converter 16. The engine 12 may include, for example, a spark-combustion type engine, a compression-combustion type engine, and/or another suitable type of engine.

Air is drawn into the engine 12 through a throttle 18. The air is mixed with fuel and combusted within cylinders (not shown) of the engine 12 to produce torque. The engine 12 outputs torque to the torque converter 16 via a crankshaft 19. The torque converter 16 supplies the torque to the transmission 14 via a transmission input shaft 20.

While the transmission 14 is shown and will be discussed as including a clutch-to-clutch type transmission, the transmission 14 may include another suitable type of transmission, such as a dual clutch transmission. The transmission 14 may include one or more gearsets (not shown) through which torque may be transferred between the transmission input shaft 20 and a transmission output shaft 22 when a gear ratio is engaged. The transmission output shaft 22 drives a driveline 24 of the vehicle system 10.

A range selector 26 enables a user to select a mode of operation of the transmission 14 including, but not limited to, a park mode, a reverse mode, a neutral mode, or one or more forward drive modes. The transmission 14 may be capable of achieving a plurality of gear ratios. For example only, the transmission 14 may be capable of achieving six forward gear ratios, a reverse gear ratio, and a neutral gear ratio. The transmission 14 may be capable of achieving a greater or lesser number of forward gear ratios and/or a greater number of reverse gear ratios.

A plurality of clutches, such as first, second, third, fourth, and fifth clutches 30, 32, 34, 36, and 38, respectively, control which one of the gear ratios is engaged within the transmission 14 at a given time. The transmission 14 may include a greater or fewer number of clutches. The first, second, third, fourth, and fifth clutches 30-38 will be collectively referred to hereafter as the clutches 30-38. For purposes of discussion only, the clutches 30-38 will be discussed as being controlled hydraulically, but the clutches 30-38 may be controlled in another suitable manner.

Pressurized fluid is provided to the clutches 30-38 from a regulated hydraulic pressure source 28 to control engagement/disengagement of the clutches 30-38. The clutches 30-38 are coupled to the hydraulic pressure source 28 via control valves 40. The control valves 40 regulate clutch pressure by selectively supplying or discharging fluid to or from the clutches 30-38.

A transmission control module (TCM) 42 controls the clutch pressures to control the gear ratio engaged within the transmission 14 and to control shifts between two gear ratios (i.e., gear shifts). A given one of the clutches 30-38 may be fully engaged when its clutch pressure is greater than a predetermined apply pressure associated with that clutch. One or more of the clutches 30-38 may be selectively engaged at a given time to achieve a given gear ratio.

Figure 2:
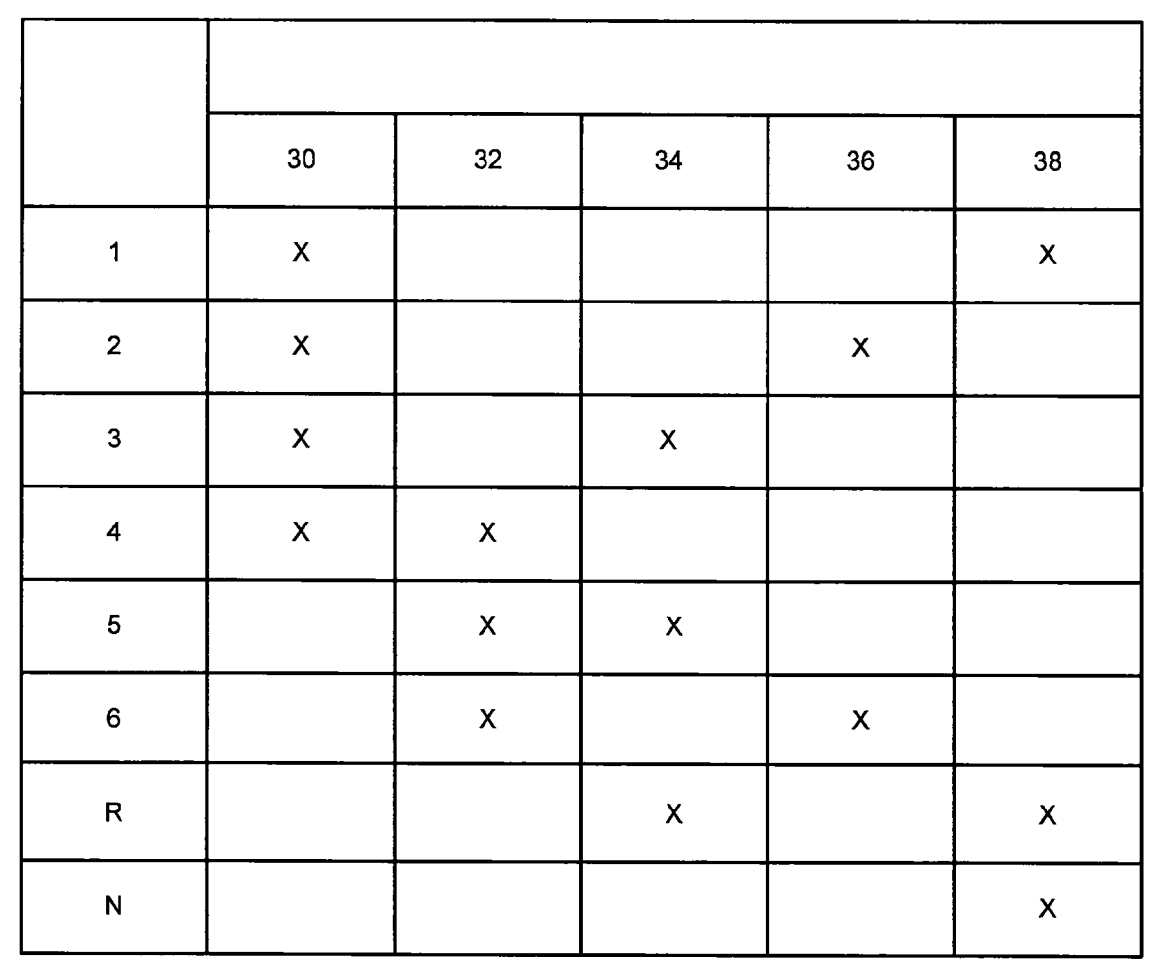

Referring now to FIG. 2, a table of exemplary clutch engagement combinations that may establish various gear ratios is presented. The table is reproduced below. Different gear ratios may be established when different combinations of one or more of the clutches 30-38 are engaged.

| Gear Ratio/ Range | Clutches Engaged | | | | |
|---|---|---|---|---|---|
| | 30 | 32 | 34 | 36 | 38 |
| 1 | X | | | | X |
| 2 | X | | | X | |
| 3 | X | | X | | |
| 4 | X | X | | | |
| 5 | | X | X | | |
| 6 | | X | | X | |
| R | | | X | | X |
| N | | | | | X |

For example only, a first forward gear ratio may be established when the first and fifth clutches 30 and 38 are engaged. A second forward gear ratio may be established when the first and forth clutches 30 and 36 are engaged. A third forward gear ratio may be established when the first and third clutches 30 and 34 are engaged. A fourth forward gear ratio may be established when the first and second clutches 30 and 32 are engaged. A fifth forward gear ratio may be established when the second and third clutches 32 and 34 are engaged. A sixth forward gear ratio may be established when the second and fourth clutches 32 and 36 are engaged. The reverse gear ratio may be established when the third and fifth clutches 34 and 38 are engaged. The neutral gear ratio may be established when only the fifth clutch 38 is engaged. As the numerical title attributed to the forward gear ratios increases, the gear ratio (i.e., ratio of transmission input speed over transmission output speed) decreases. For example only, the gear ratio associated with the first forward gear ratio is greater than the gear ratio associated with the second gear ratio.

A gear shift between successive forward gear ratios is accomplished by disengaging a first one of the clutches 30-38 and engaging a second one of the clutches 30-38 while the engagement of a third one of the clutches 30-38 is maintained. The engagement and the disengagement of the first and second ones of the clutches 30-38 may be performed in concert. The clutch being disengaged is referred to as the offgoing clutch, and the clutch being engaged is referred to as the oncoming clutch.

For example only, a gear shift from the first forward gear ratio to the second forward gear ratio may be accomplished by disengaging the fifth clutch 38, engaging the fourth clutch 36, and maintaining the first clutch 30 as engaged. A gear shift from the second forward gear ratio to the third forward gear ratio may be accomplished by disengaging the fourth clutch 36, engaging the third clutch 34, and maintaining the first clutch 30 as engaged. A gear shift from the third forward gear ratio to the fourth forward gear ratio may be accomplished by disengaging the third clutch 34, engaging the second clutch 32, and maintaining the first clutch 30 as engaged. A gear shift from the fourth forward gear ratio to the fifth forward gear ratio may be accomplished by disengaging the first clutch 30, engaging the third clutch 34, and maintaining the second clutch 32 as engaged. A gear shift from the fifth forward gear ratio to the sixth forward gear ratio may be accomplished by disengaging the third clutch 34, engaging the fourth clutch 36, and maintaining the second clutch 32 as engaged.

A gear shift from an N-th forward gear ratio to an M-th forward gear ratio, where M is greater than N, may be referred to as an upshift. In contrast, a gear shift from an N-th forward gear ratio to an M-th forward gear ratio, where M is less than N, may be referred to as a downshift.

Referring back to FIG. 1, a first speed sensor 50 measures a rotational speed of a turbine (not shown) of the torque converter 16 and generates a turbine speed signal based on the rotational speed of the turbine. In various implementations, the first speed sensor 50 may measure rotational speed of the transmission input shaft 20 or another suitable transmission input speed. A second speed sensor 52 measures rotational speed of the transmission output shaft 22 and generates an output shaft speed signal based on the rotational speed of the transmission output shaft 22.

An engine control module (ECM) 60 controls operation of the engine 12. For example only, the ECM 60 may control opening of the throttle 18, fueling provided to the engine 12, and other suitable engine operating parameters. The ECM 60 may, for example, control torque output by the engine 12 (i.e., torque about the crankshaft 19, which may be referred to as engine torque).

The ECM 60 may also control a motor generator unit (MGU) 62. The MGU 62 may selectively supplement the engine torque under some circumstances. The MGU 62 may also apply a load (i.e., a negative torque relative to combustion torque) under some circumstances, such as during regenerative braking. Regenerative braking may be performed, for example, to generate electrical energy for the vehicle system 10. The MGU 62 may include, for example, a belt alternator starter (BAS) or another suitable type of MGU. While the MGU 62 is shown in the exemplary embodiment of FIG. 1 as interfacing the crankshaft 19 between the engine 12 and the torque converter 16, the MGU 62 may interface the crankshaft 19 in another suitable manner, such as via a belt-pulley system.

The ECM 60 and the TCM 42 may communicate and/or share one or more parameters. For example only, the ECM 60 may determine the engine torque and communicate the engine torque to the TCM 42. The TOM 42 may control various aspects of a gear shift based on the engine torque. The TCM 42 of the present disclosure may include a negative torque upshift (NTU) module 70. The NTU module 70 controls offgoing clutch pressure during an upshift performed when the engine torque is negative.

Figure 3:
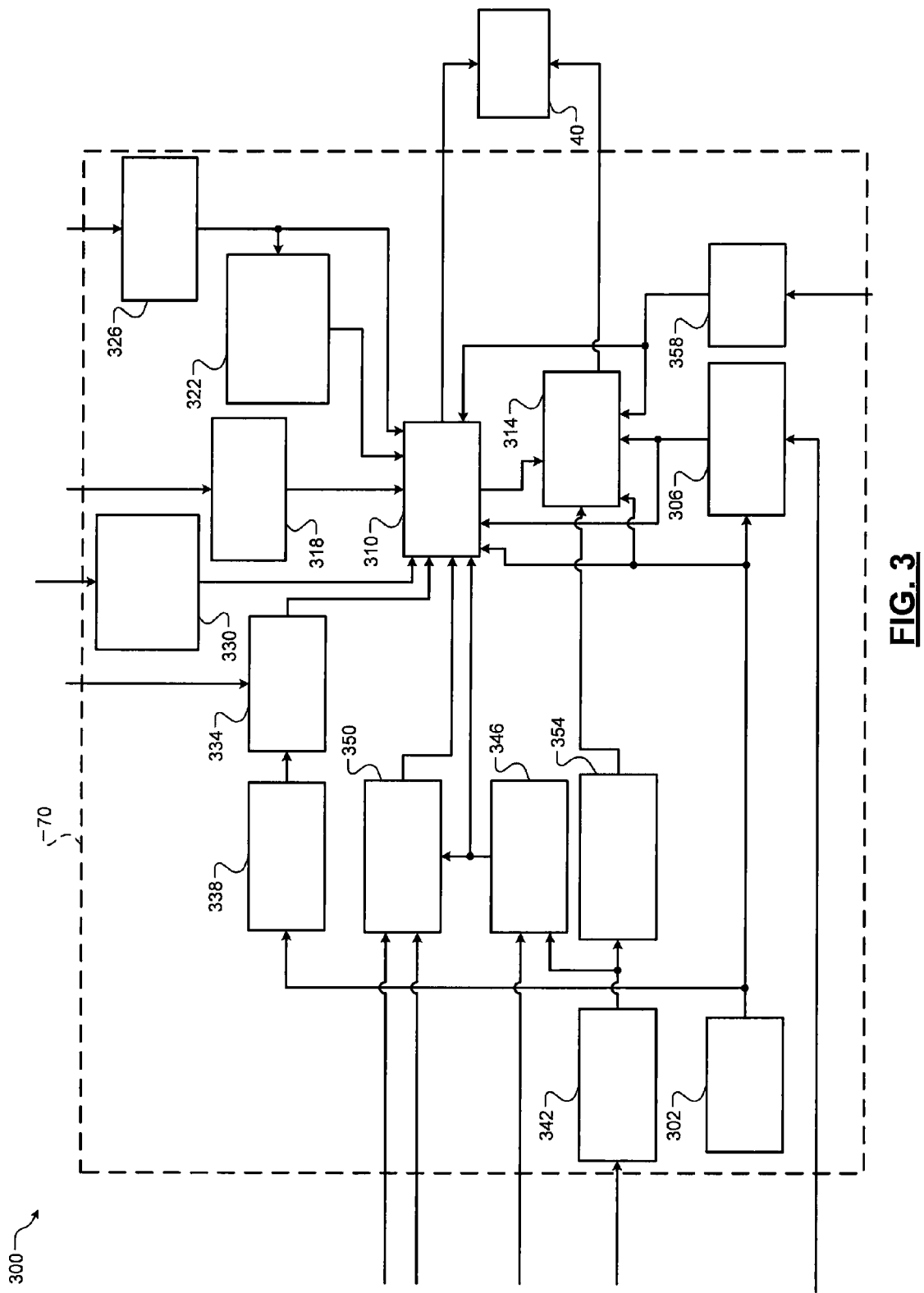
FIG. 3 is a functional block diagram of an exemplary negative torque upshift module according to the principles of the present disclosure.

Referring now to FIG. 3, a functional block diagram of an exemplary implementation of an NTU system 300 including the NTU module 70 is presented. The NTU module 70 may include a shift command module 302, a primary clutch selection module 306, an offgoing clutch control module 310, an oncoming clutch control module 314, a base pressure determination module 318, and a slip ramp pressure determination module 322. The NTU module 70 may also include a slip detection module 326, a turbine acceleration control module 330, a closed-loop pressure module 334, and a target turbine speed module 338. The NTU module 70 may also include a period to sync estimation module 342, a sync blip triggering module 346, a sync blip determination module 350, an oncoming clutch triggering module 354, and a sync detection module 358.

Figure 4:
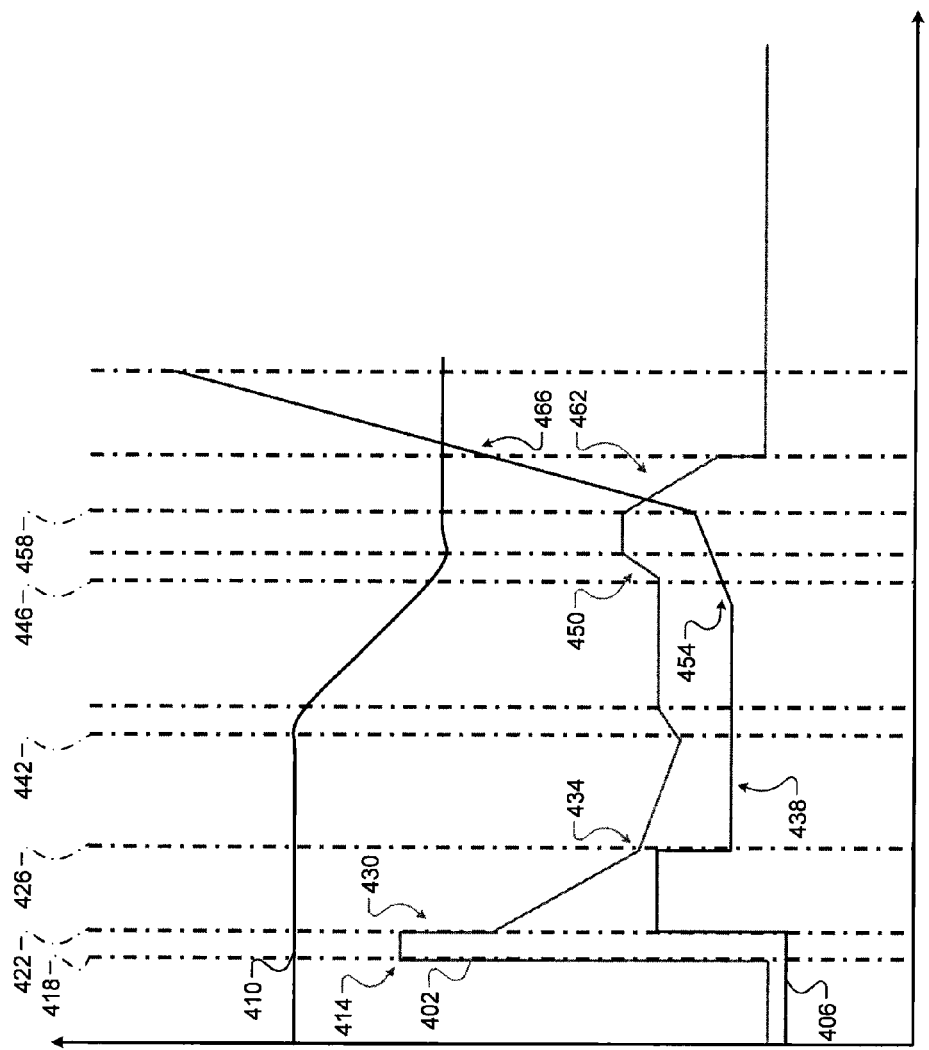
FIG. 4 is an exemplary graph depicting offgoing clutch pressure, oncoming clutch pressure, and turbine speed as a function of time during a negative torque upshift according to the principles of a present disclosure.

Referring also to FIG. 4, an exemplary graph depicting offgoing clutch pressure, oncoming clutch pressure, and turbine speed as functions of time are presented. Exemplary trace 402 tracks the offgoing clutch pressure. Exemplary trace 406 tracks the oncoming clutch pressure. Exemplary trace 410 tracks the turbine speed.

The shift command module 302 selectively commands performance of an upshift. The shift command module 302 may command the performance of an upshift based on a vehicle speed, rotational speed of the crankshaft 19 (i.e., engine speed), the turbine speed, an accelerator pedal position, and/or one or more other suitable parameters. The shift command module 302 may also provide other information with the upshift command, such as the current gear ratio, the next gear ratio, a synchronization speed, and/or other suitable information.

When the upshift is commanded, the primary clutch selection module 306 determines whether the offgoing clutch or the oncoming clutch should primarily be controlled for the upshift. In other words, the primary clutch selection module 306 determines whether primary oncoming clutch control or primary offgoing clutch control should be used for the upshift. The primary clutch selection module 306 selects the offgoing clutch or the oncoming clutch based on the engine torque. For example only, the primary clutch selection module 306 selects the offgoing clutch when the engine torque is less than a predetermined negative torque. The predetermined negative torque may be calibratable and may be, for example, approximately −50 Nm. In this manner, the offgoing clutch pressure is primarily controlled during a negative torque upshift (NTU).

The offgoing and oncoming clutch control modules 310 and 314 are notified when the upshift is commanded and whether the offgoing clutch or the oncoming clutch is to be controlled for the upshift. The offgoing clutch control module 310 selectively controls the offgoing clutch pressure during the upshift, and the oncoming clutch control module 314 controls the oncoming clutch pressure during the upshift. For example only, the offgoing and oncoming clutch control modules 310 and 314 may generate offgoing and oncoming clutch pressure commands, respectively. The control valves 40 may control the clutch pressures of the offgoing and oncoming clutches based on the offgoing and oncoming clutch pressure commands, respectively.

When a gearshift (e.g., the upshift) is commanded, the offgoing clutch is engaged and filled. For example only, the offgoing clutch pressure may be at approximately a predetermined apply pressure associated with the offgoing clutch. When the engine torque is negative (i.e., less than the predetermined negative torque) when the upshift is commanded, the offgoing clutch control module 310 boosts (i.e., increases) the offgoing clutch pressure to a predetermined boost pressure that is greater than the predetermined apply pressure. This is illustrated in the example of FIG. 4 at 414.

The offgoing clutch control module 310 may maintain the offgoing clutch pressure at the predetermined boost pressure for a predetermined boost period. The time at which the offgoing clutch control module 310 boosts the offgoing clutch pressure to the predetermined boost pressure may be referred to as a first time 418. The first time 418 may correspond to when the upshift is commanded.

The offgoing clutch control module 310 selectively triggers the oncoming clutch control module 314 to fill the oncoming clutch at a second time 422. The second time 422 may be, for example, when the predetermined boost period ends. The oncoming clutch control module 314 determines a fill pressure for the oncoming clutch and determines a fill period for the oncoming clutch. The fill period may refer to how long to maintain the oncoming clutch pressure at the fill pressure to fill the oncoming clutch.

The oncoming clutch control module 314 increases the oncoming clutch pressure to the fill pressure beginning at the second time 422. The oncoming clutch control module 314 maintains the oncoming clutch pressure at the predetermined fill pressure for the fill period. A third time 426 may correspond to when the fill period ends.

The offgoing clutch control module 310 may selectively decrease the offgoing clutch pressure from the boost pressure at the second time 422. For example only, the offgoing clutch control module 310 may decrease the offgoing clutch pressure by a predetermined amount at the second time 422. An exemplary decrease is illustrated in FIG. 4 at 430.

The offgoing clutch control module 310 selectively decreases the offgoing clutch pressure during the fill period. This decrease may be referred to as a boost ramp, and the offgoing clutch control module 310 may ramp the offgoing clutch pressure down to an end of boost ramp pressure during the fill period. The end of boost ramp pressure is greater than the predetermined apply pressure of the offgoing clutch and may be, for example, a predetermined amount or percentage greater than the predetermined apply pressure of the offgoing clutch.

The offgoing clutch control module 310 determines a ramp rate for the boost ramp based on a quotient of a difference between the offgoing clutch pressure at the second time 422 (after the decrease) and the end of boost ramp pressure over the fill period. The offgoing clutch control module 310 decreases the offgoing clutch pressure toward the end of boost ramp pressure at the boost ramp rate during the fill period. In this manner, the offgoing clutch pressure reaches the end of boost ramp pressure when the fill period ends (i.e., at the third time 426). In the example of FIG. 4, the offgoing clutch pressure reaching the end of boost ramp pressure is illustrated at 434.

At the third time 426, the oncoming clutch control module 314 may decrease the oncoming clutch pressure to a predetermined staging pressure associated with the oncoming clutch. The predetermined staging pressure is less than the predetermined fill pressure. This is illustrated in the example of FIG. 4 at 438.

The offgoing clutch control module 310 further selectively decreases the offgoing clutch pressure during a slip period that begins at the third time 426. This decrease during the slip period may be referred to as a slip ramp. During the slip period, the offgoing clutch control module 310 may set the offgoing clutch pressure using the equation:

$$OCP = \text{Base OCP} - \text{Slip Ramp P}, \quad (1)$$

where OCP is the offgoing clutch pressure, Base OCP is a base offgoing clutch pressure, and Slip Ramp P is a slip ramp pressure.

The base pressure determination module 318 may determine the base offgoing clutch pressure based on a clutch gain, the engine torque, a NTU adaptive pressure, and a slip ramp offset pressure. For example only, the base pressure determination module 318 may determine the base offgoing clutch pressure using the equation:

$$\text{Base OCP} = \text{Gain}*(-1)*(\text{Engine Torque}) + \text{NTU Adaptive P} + \text{Offset}, \quad (2)$$

where base OCP is the base offgoing clutch pressure, gain is the gain of the offgoing clutch, Engine Torque is the engine torque, NTU Adaptive P is the NTU adaptive pressure, and Offset is the slip ramp offset pressure. The gain may be determined based on the offgoing clutch pressure to clutch torque relationship of the offgoing clutch. The slip ramp offset pressure may be a predetermined value and may be selected based on the upshift.

The NTU adaptive pressure may be set based on a comparison of a desired period between the second time 422 and a fourth time 442 when the offgoing clutch begins to slip (i.e., when an inertia phase of the upshift begins) and the measured period between the second time 422 and when the offgoing clutch begins to slip. For example only, the NTU adaptive pressure may be increased when the measured period is less than the desired period, and the NTU adaptive pressure may be decreased when the measured period is greater than the desired period.

The slip ramp pressure determination module 322 determines the slip ramp pressure. The slip ramp pressure determination module 322 may reset the slip ramp pressure to a predetermined reset value (e.g., 0) at the third time 426 and may selectively increment the slip ramp pressure by a predetermined amount each predetermined period during the slip period. The boost ramp rate may be more negative than the slip ramp rate.

The slip detection module 326 detects when the offgoing clutch slips. The slip detection module 326 generates a slipping signal when the offgoing clutch slips. The slip detection module 326 may detect slip of the offgoing clutch based on the turbine speed or another suitable parameter. For example only, as the turbine speed may remain constant (under steady-state operating conditions) when the current gear is engaged, the slip detection module 326 may detect slip of the offgoing clutch when the turbine speed changes (e.g., decreases) by more than a predetermined amount or percentage.

After the offgoing clutch slips (i.e., after the fourth time 442), the slip ramp pressure determination module 322 freezes the slip ramp pressure. In other words, the slip ramp pressure determination module 322 may maintain the slip ramp pressure after the fourth time 442. The slip ramp pressure determination module 322 may freeze the slip ramp pressure for the rest of the upshift.

The offgoing clutch control module 310 determines the offgoing clutch pressure based on the base offgoing clutch pressure and the slip ramp pressure after the fourth time 442. The offgoing clutch control module 310 determines the offgoing clutch pressure further based on a turbine acceleration offset and a closed-loop pressure after the fourth time. For example only, the offgoing clutch control module 310 may determine the offgoing clutch pressure after the fourth time using the equation:

$$OCP = \text{Base OCP} - \text{Slip Ramp P} + \text{Turbine Offset} + \text{CL P}, \quad (3)$$

where OCP is the offgoing clutch pressure, Base OCP is the base offgoing clutch pressure, Slip Ramp P is the slip ramp pressure (which is constant after the fourth time 442), Turbine Offset is the turbine acceleration offset, and CL P is the closed-loop (CL) pressure. The turbine acceleration control module 330 may determine the turbine acceleration offset based on the engine torque and the synchronization speed for the upshift. The synchronization speed corresponds to the turbine speed when the next gear ratio is engaged.

The closed-loop pressure module 334 determines the closed-loop pressure based on the turbine speed and a target turbine speed. For example only, the closed-loop pressure module 334 may determine the closed-loop pressure using a proportional (i.e., P) control scheme based on a proportional gain and a difference between the target turbine speed, the turbine speed. The target turbine speed module 338 may determine the target turbine speed for the upshift. For example only, the target turbine speed module 338 may determine the target turbine speed from a predetermined turbine speed profile for the upshift.

The offgoing clutch control module 310 may determine the offgoing clutch pressure using equation (3) until a fifth time 446. The fifth time 446 may correspond to a first predetermined period before the turbine speed reaches the synchronization speed. The period to sync estimation module 342 estimates a period between a current time and a time when the turbine speed will reach the synchronization speed. For example only, the period to sync estimation module 342 may estimate the period based on the turbine speed and the synchronization speed.

The sync blip triggering module 346 monitors the estimated period between the current time and the time when the turbine speed will reach the synchronization speed. The sync blip triggering module 346 generates a near sync signal based on a comparison of the estimated period and the first predetermined period. For example only, the sync blip triggering module 346 may generate the near sync signal when the estimated period becomes less than the first predetermined period.

After the near sync signal is generated (i.e., at and after the fifth time 446), the offgoing clutch control module 310 may determine the offgoing clutch pressure based on the base offgoing clutch pressure, the slip ramp pressure, the turbine acceleration offset, the closed-loop pressure, and a synchronization blip pressure. For example only, the offgoing clutch control module 310 may determine the offgoing clutch pressure after the fifth time using the equation:

$$OCP = \text{Base OCP} - \text{Slip Ramp P} + \text{Turbine Offset} + \text{CL P} + \text{Sync Blip}, \quad (4)$$

where OCP is the offgoing clutch pressure, Base OCP is the base offgoing clutch pressure, Slip Ramp P is the slip ramp pressure (which is frozen after the fourth time 442), Turbine Offset is the turbine acceleration offset, CL P is the closed-loop (CL) pressure, and Sync Blip is the synchronization blip pressure. The addition of the synchronization blip pressure to the offgoing clutch pressure after the fifth time 446 is illustrated in the example of FIG. 4 at 450.

The sync blip determination module 350 determines the synchronization blip pressure. The sync blip determination module 350 may determine the synchronization blip pressure, for example, based on an initial turbine speed and the engine torque. For example only, the initial turbine speed may correspond to the turbine speed at the time when the near sync indicator is generated. Adding the sync blip pressure to the offgoing clutch pressure may smooth the transition of the turbine speed to the synchronization speed.

The oncoming clutch triggering module 354 also monitors the estimated period between the current time and the time when the turbine speed will reach the synchronization speed. The oncoming clutch triggering module 354 may generate an oncoming clutch pressure signal based on a comparison of the estimated period and a second predetermined period. For example only, the oncoming clutch triggering module 354 may generate the oncoming clutch pressure signal when the estimated period becomes less than the second predetermined period. The second predetermined period may be greater than the first predetermined period.

The oncoming clutch control module 314 may ramp up the oncoming clutch pressure after the oncoming clutch pressure signal is generated. In the example of FIG. 4, the ramping up of the oncoming clutch pressure is illustrated at 454. The oncoming clutch control module 314 may ramp the oncoming clutch pressure up at a first oncoming ramp rate after the oncoming clutch pressure signal is generated. The oncoming clutch control module 314 may ramp the oncoming clutch pressure up at the first oncoming ramp rate until a sixth time 458.

The sixth time 458 may correspond to when the turbine speed is approximately equal to the synchronization speed. The sync detection module 358 monitors the turbine speed and the synchronization speed. The sync detection module 358 selectively generates a sync signal when the turbine speed is approximately equal to the synchronization speed. For example only the sync detection module 358 may generate the sync indicator when the turbine speed has been approximately equal to the synchronization speed for a predetermined period. In the example of FIG. 4, the sync detection module 358 may generate the sync signal at approximately the sixth time 458.

After the sync signal is generated (i.e., at the sixth time 458), the offgoing clutch control module 310 decreases the offgoing clutch pressure to disengage the offgoing clutch. The offgoing clutch control module 310 may decrease the offgoing clutch pressure at a predetermined rate after the sync signal is generated. An example of decreasing the offgoing clutch pressure after the sync signal is illustrated at 462 in the example of FIG. 4.

The oncoming clutch control module 314 begins to further increase the oncoming clutch pressure to engage the oncoming clutch when the sync signal is generated. The oncoming clutch control module 314 may ramp the oncoming clutch pressure up at a second oncoming ramp rate after the sync signal is generated. The second oncoming ramp rate may be greater than the first oncoming ramp rate. An example of increasing the oncoming clutch pressure at the second oncoming ramp rate after the sync signal is illustrated at 466 in the example of FIG. 4.

Figure 5A:
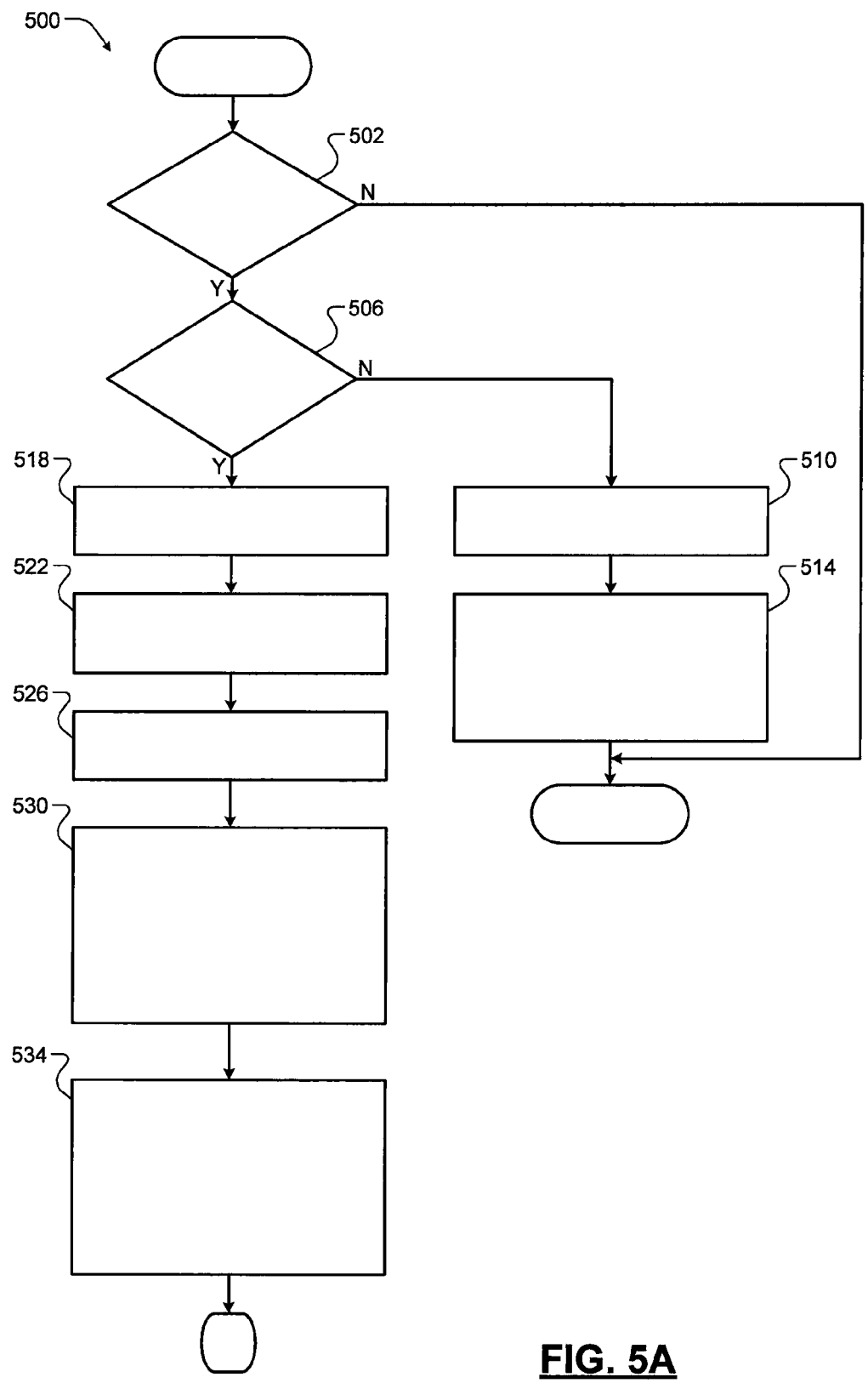
FIGS. 5A-5B are flowcharts depicting an exemplary method of controlling the oncoming and offgoing clutch pressures during a negative torque upshift according to the principles of the present disclosure.
Figure 5B:
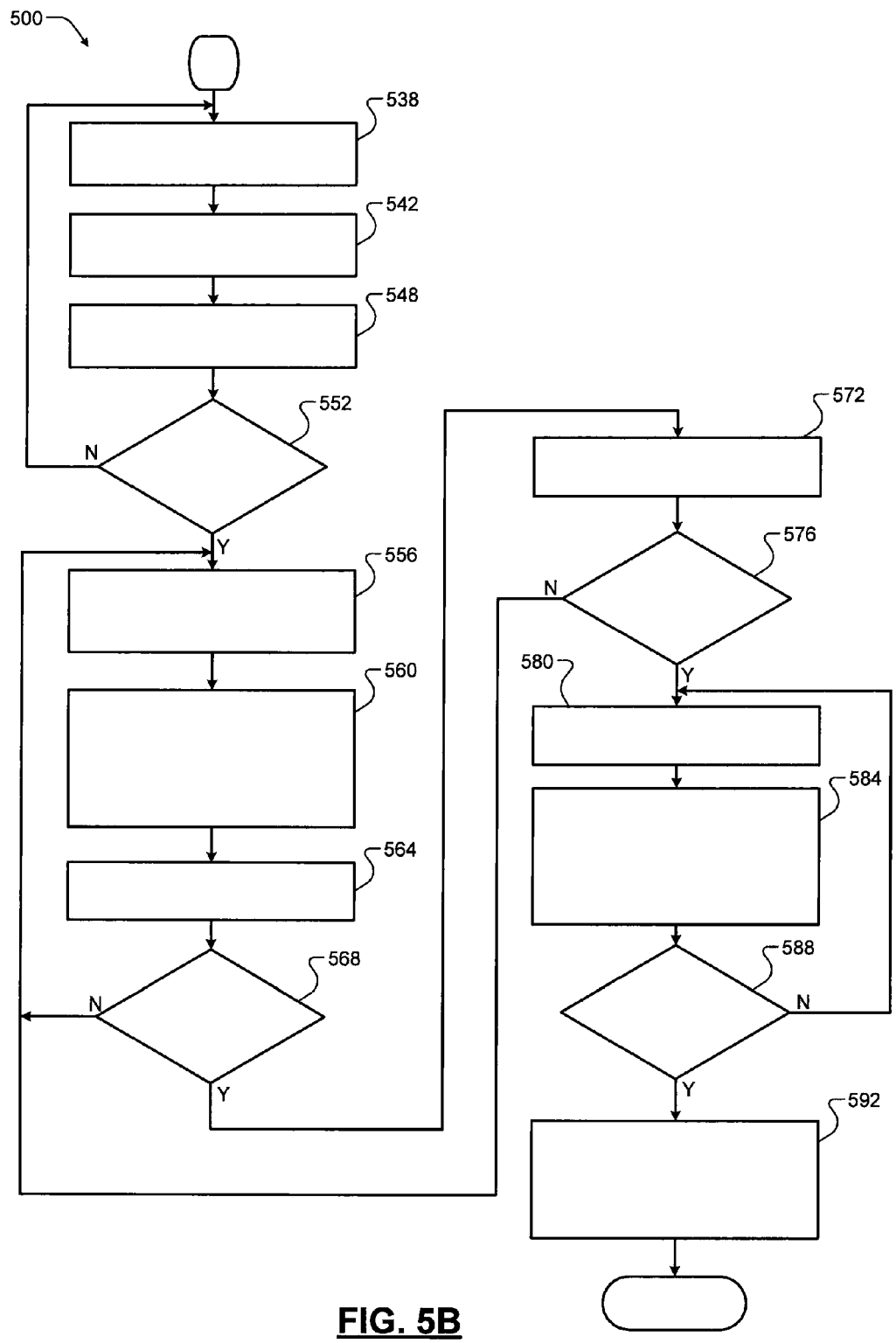

Referring now to FIGS. 5A-5B, a flowchart depicting an exemplary method 500 of controlling the oncoming and offgoing clutch pressures for an upshift is presented. Control may begin with 502 where control determines whether an upshift should be performed. If true, control may continue with 506; if false, control may end. At 506, control determines whether the engine torque is less than the predetermined NTU torque. If false, control may transfer to 510; if true, control may continue with 518. 518 is discussed further below. For example only, the predetermined NTU torque may be approximately −50 Nm.

Control may use oncoming clutch pressure control for the upshift at 510 and continue with 514. At 514, control may release the offgoing clutch, fill the oncoming clutch, and, when the turbine speed nears the synchronization speed, selectively engage the oncoming clutch. For example only, control may increase the oncoming clutch pressure when the turbine speed is within a predetermined amount or percentage of the synchronization speed. Control may then end.

Referring back to 518 (i.e., when the engine torque is less than the predetermined NTU torque), control uses the offgoing clutch pressure control for the NTU. At 522, control boosts the offgoing clutch pressure. For example only, control may boost (i.e., increase) the offgoing clutch pressure up to the predetermined boost pressure and maintain the offgoing clutch pressure at the predetermined boost pressure for a predetermined boost period at 522.

At 526, control may selectively decrease the offgoing clutch pressure. For example only, control may selectively decrease the offgoing clutch pressure by a predetermined amount or percentage or to a predetermined beginning boost ramp pressure at 526. Control may determine the end of boost ramp pressure, determine the fill pressure associated with the oncoming clutch, determine the fill period associated with the oncoming clutch, and determine the boost ramp rate at 530. The end of boost ramp pressure may be, for example, a predetermined amount or percentage greater than the predetermined apply pressure of the offgoing clutch. Control may determine the boost ramp rate based on the quotient of the difference between the offgoing clutch pressure when the boost ramp begins and the end of boost ramp pressure over the oncoming clutch fill period.

Control fills the oncoming clutch at the fill pressure for the fill period at 534. Control also ramps down the offgoing clutch pressure at the boost ramp rate during the fill period at 534. In this manner, control ramps the offgoing clutch pressure down to the end of boost pressure when the fill period ends. Control continues with 538 of FIG. 5B.

At 538, control determines the base offgoing clutch pressure. Control may determine the base offgoing clutch pressure using equation (2), as described above. Control may set the offgoing clutch pressure equal to the difference between the base offgoing clutch pressure and the slip ramp pressure at 542. Control may increment the slip ramp pressure at 548.

Control determines whether the offgoing clutch is slipping at 552. If true, control continues with 556; if false, control returns to 538. In this manner, control decreases the offgoing clutch pressure at the slip ramp rate until the offgoing clutch slips. The slip ramp rate is less than the boost ramp rate. Control does not increment the slip ramp pressure after the offgoing clutch slips at 552. In this manner, control freezes the slip ramp pressure and stops further ramping down the offgoing clutch pressure at the slip ramp rate after 552.

At 556, control determines the target turbine speed and the base offgoing clutch pressure. Control may determine the target turbine speed from a predetermined turbine speed profile. At 560, control sets the offgoing clutch pressure to a sum of the turbine acceleration offset, the closed-loop pressure, and the difference between the base offgoing clutch pressure and the slip ramp pressure.

Control estimates the period between the current time and the time when the turbine speed will be approximately equal to the synchronization speed at 564. Control determines whether the estimated period is less than the second predetermined period at 568. If true, control may continue with 572; if false, control returns to 556.

Control determines whether the estimated period is less than the first predetermined period at 576. If true, control continues with 580; if false, control returns to 552. The first predetermined period is less than the second predetermined period. At 580, control determines the base offgoing clutch pressure. At 584, control sets the offgoing clutch pressure to a sum of the turbine acceleration offset, the closed-loop pressure, the sync blip pressure, and the difference between the base offgoing clutch pressure and the slip ramp pressure.

Control determines whether the turbine speed is approximately equal to the synchronization speed at 588. If true, control continues with 592; if false, control returns to 580. Control selectively boosts the oncoming clutch pressure and selectively decreases the offgoing clutch pressure at 592. In this manner, control engages the oncoming clutch and disengages the offgoing clutch to complete the upshift. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A clutch control system for a vehicle, comprising:
a shift command module that commands an upshift of a clutch-to-clutch transmission when an engine torque is less than a predetermined negative torque; and
an offgoing clutch control module that increases an offgoing clutch pressure above a predetermined apply pressure in response to the command,
wherein an offgoing clutch is fully engaged when the offgoing clutch pressure is greater than the predetermined apply pressure.

2. The clutch control system of claim 1 wherein the offgoing clutch control module maintains the offgoing clutch pressure at a predetermined pressure that is greater than the predetermined apply pressure for a predetermined period in response to the command.

3. The clutch control system of claim 1 further comprising an oncoming clutch control module that fills an oncoming clutch for a fill period after the increase.

4. The clutch control system of claim 3 wherein the offgoing clutch control module decreases the offgoing clutch pressure at a first rate during the fill period.

5. The clutch control system of claim 4 wherein the offgoing clutch control module further decreases the offgoing clutch pressure at a second rate after the fill period.

6. The clutch control system of claim 5 wherein the second rate is less negative than the first rate.

7. The clutch control system of claim 5 wherein the offgoing clutch control module decreases the offgoing clutch pressure at the second rate until the offgoing clutch slips.

8. The clutch control system of claim 7 wherein the offgoing clutch control module increases the offgoing clutch pressure based on a difference between a target transmission input speed and a measured transmission input speed after the offgoing clutch slips.

9. The clutch control system of claim 7 further comprising an acceleration control module that determines a pressure offset based on a synchronization speed of the upshift and the engine torque,
wherein the offgoing clutch control module increases the offgoing clutch pressure based on the pressure offset after the offgoing clutch slips.

10. The clutch control system of claim 7 further comprising a sync blip determination module that determines a blip pressure based on a measured transmission input speed,
wherein the offgoing clutch control module increases the offgoing clutch pressure based on the blip pressure beginning a predetermined period before the measured transmission input speed decreases to a synchronization speed of the upshift.

11. A clutch control method for a vehicle, comprising:
commanding an upshift of a clutch-to-clutch transmission when an engine torque is less than a predetermined negative torque; and
increasing an offgoing clutch pressure above a predetermined apply pressure in response to the command,
wherein an offgoing clutch is fully engaged when the offgoing clutch pressure is greater than the predetermined apply pressure.

12. The clutch control method of claim 11 further comprising maintaining the offgoing clutch pressure at a predetermined pressure that is greater than the predetermined apply pressure for a predetermined period in response to the command.

13. The clutch control method of claim 11 further comprising filling an oncoming clutch for a fill period after the increase.

14. The clutch control method of claim 13 further comprising decreasing the offgoing clutch pressure at a first rate during the fill period.

15. The clutch control method of claim 14 further comprising further decreasing the offgoing clutch pressure at a second rate after the fill period.

16. The clutch control method of claim 15 wherein the second rate is less negative than the first rate.

17. The clutch control method of claim 15 further comprising decreasing the offgoing clutch pressure at the second rate until the offgoing clutch slips.

18. The clutch control method of claim 17 further comprising increasing the offgoing clutch pressure based on a difference between a target transmission input speed and a measured transmission input speed after the offgoing clutch slips.

19. The clutch control method of claim 17 further comprising:
   determining a pressure offset based on a synchronization speed of the upshift and the engine torque; and
   increasing the offgoing clutch pressure based on the pressure offset after the offgoing clutch slips.

20. The clutch control method of claim 17 further comprising:
   determining a blip pressure based on a measured transmission input speed; and
   increasing the offgoing clutch pressure based on the blip pressure beginning a predetermined period before the measured transmission input speed decreases to a synchronization speed of the upshift.

* * * * *